United States Patent [19]

Snyder

[11] 3,816,273

[45] June 11, 1974

[54] METHOD OF CHEMICALLY FORMING WIRE

[75] Inventor: H. Ben Snyder, Upland, Calif.

[73] Assignee: General Dynamics Corporation (Pomona Division), Pomona, Calif.

[22] Filed: Dec. 22, 1972

[21] Appl. No.: 317,563

[52] U.S. Cl. .................................. 204/129.9, 156/8

[51] Int. Cl. .......................... C23b 3/06, C23b 1/00

[58] Field of Search ........ 204/129.65, 129.9; 156/3, 156/8, 11

[56] References Cited

UNITED STATES PATENTS

| | | | |
|---|---|---|---|
| 2,315,696 | 4/1943 | Faust | 204/129.9 |
| 2,334,699 | 11/1943 | Faust | 204/129.9 |
| 3,231,380 | 1/1966 | Law | 96/36 |
| 3,536,545 | 10/1970 | Traynor et al. | 156/8 |
| 3,562,036 | 2/1971 | Travis | 156/8 |

FOREIGN PATENTS OR APPLICATIONS

| | | | |
|---|---|---|---|
| 726,133 | 3/1955 | Great Britain | 204/129.65 |

*Primary Examiner*—T. M. Tufariello

[57] ABSTRACT

Disclosed is a method for chemically forming wire.

18 Claims, 10 Drawing Figures

METHOD OF CHEMICALLY FORMING WIRE

BACKGROUND OF THE INVENTION

The manufacture of welded cross-wired electronic modules, generally described in U.S. Pat. No. 3,216,089, requires conductor wires to be formed as part of the cross-wire preform. All previous attempts to manufacture such conductor wires, having acceptable weld strengths and cross-sections, have been unsuccessful.

SUMMARY OF THE INVENTION

The invention is directed to the chemical forming of conductor wires suitable for use as part of a cross-wire preform. The wires are formed by:

1. chemically removing a top and bottom layer of material from the workpiece;
2. masking aligned patterns on the upper and lower surfaces of the workpiece;
3. chemically milling the unmasked portions of the workpiece; and
4. electro-chemically polishing the chemically milled wires.

This manufacturing process produces weldable conductor wires of suitable cross-section for cross-wire preforms or other similar applications.

DESCRIPTION OF THE PREFERRED EMBODIMENTS

Figure 1:
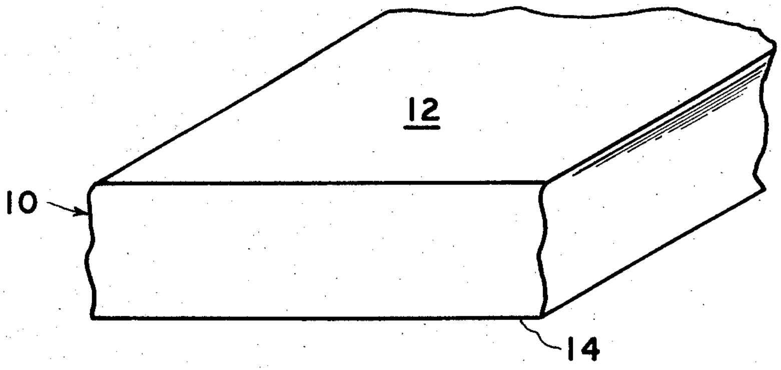
FIGS. 1–8 illustrate the steps of a manner of carrying out the present inventive method.
Figure 9:
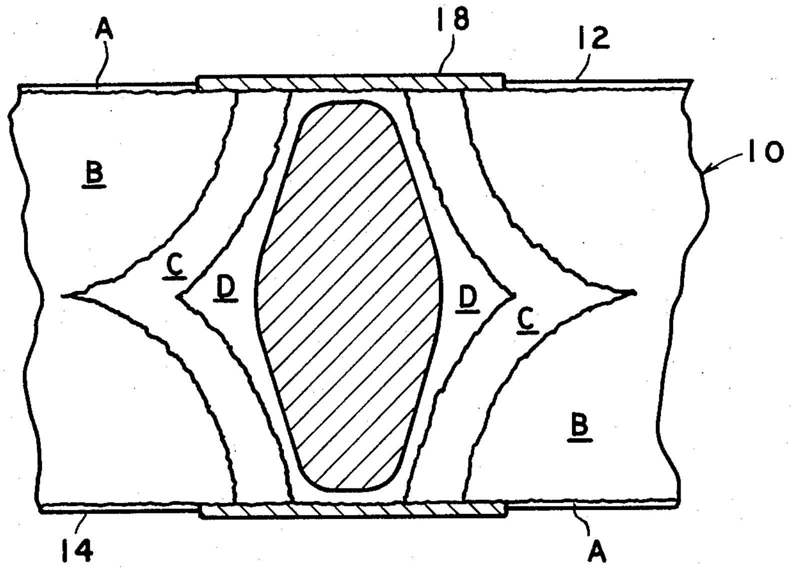
FIG. 9 is a composite illustration of the steps of the inventive method of FIGS. 1–8.

The basic steps of the method of chemically forming wires are individually illustrated in FIGS. 1–8 with FIG. 9 illustrating a composite representation of the entire process. FIG. 1 generally illustrates a portion of the workpiece 10 from which the wires are to be formed. The workpiece 10 is a flat sheet of an electrically conductive material which is susceptible to chemical etching or milling. While the process will be described with particularity as to nickel and/or nickel alloys, iron, magnesium, zinc, titanium, aluminum, and other metals and their alloys can be formed into wires in this manner.

Figure 2:
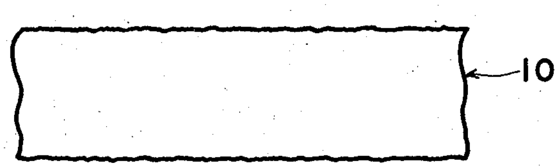

By way of example, the workpiece 10 may be a sheet of nickel having any thickness depending upon the desired final height of the wire. In many applications, a sheet of nickel having a thickness of between 0.010 inches and 0.10 inches could be selected. The first step in the process is to chemically remove or etch from between 0.0005 inches and 0.0015 inches of metal from both the upper and lower surfaces, 12 and 14 respectively, of the workpiece 10. Any etchant, specific for the metal employed, is suitable for this first step, — such as 42° Baume ferric chloride ($FeCl_3$) solution for nickel. FIG. 2 shows the workpiece 10 after this initial chemical etching.

Figure 3:
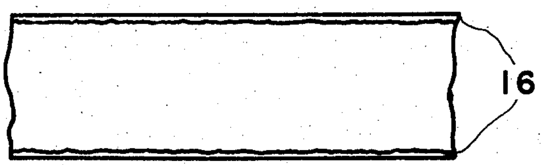
Figure 4:
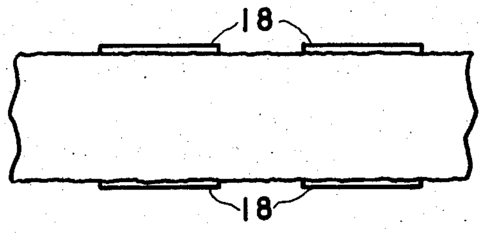

This initial surface material removal is performed to remove any work-hardened surface layers which would have higher resistance to subsequent chemical action than the interior base material. These work-hardened surface layers also tend to form surface hooks on the etched or milled faces. Additionally, this layer removal serves to roughen the upper and lower surfaces of the workpiece so as to increase adhesion of the photoprocessed resist (image) or other masking which will be applied to these surfaces during subsequent process steps. Good adhesion is necessary during subsequent prolonged chemical milling to prevent lifting of the resist which would cause poor edge definitions, irregular wire widths or possibly even destruction of the wire surfaces. As illustrated in FIG. 3, a suitable photoresist 16 such as KMER or Riston, both manufactured and sold by DuPont, or some other conventional photoresist, is applied to both the upper and lower surfaces of the workpiece 10. Aligned resist patterns are then formed on both workpiece surfaces as shown in FIG. 4 by exposing the photoresist through a photographic negative and developing the photoresist to leave a resist pattern corresponding to the positive image with the remainder of the surface bare. Close alignment of the resist patterns is required to insure verticality of the final wires.

While resist patterns have been described as produced by photo exposure and development, other masks of chemical resistant material may be suitable. Lacquers, waxes, inks, acid resistant elastomers, or oriented polyethylene terephthalate film (such as Mylar tape) can be utilized either by coating the entire surface, screening-on the resist pattern, and stripping the areas to be etched or milled or by selectively applying these materials to the surfaces which are not to be etched or milled.

Figure 5:
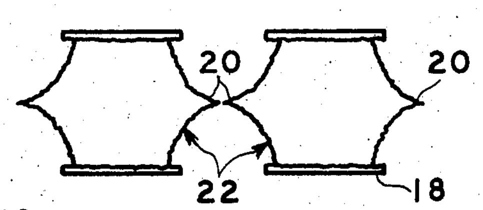
Figure 6:
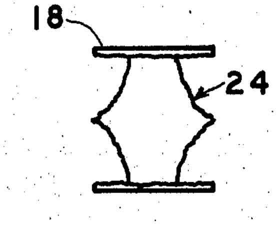
Figure 8:
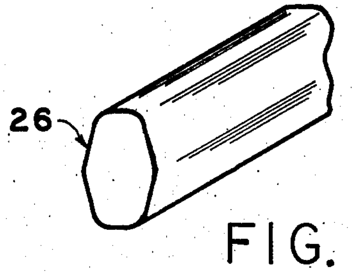

Once the aligned resist patterns have been formed, the workpiece is then chemically milled with a suitable solution, such as 42° Baume ferric chloride for nickel, until "cut-through." "Cut-through" is defined as the disappearance to the unaided eye of the feather edge on the last removed metal of the web between adjacent formed wires. A non-oscillating spray type chemical milling machine can be used. FIG. 5 illustrates the wires after the chemical milling, showing cut-through ridges 20 on the cut-through shape wires 22.

To reduce the cut-through ridges 20, the wires 22 are overmilled by continued chemical milling in the same solution. The duration of the overmilling will markedly change the final wire dimensions and is established as a percentage of the initial cut-through chemical milling time, for example 20–80 percent. The cut-through ridges are chemically attacked along two sides and therefore are reduced in length much faster than the more flat surfaces prior to cut-through. While a higher degree of flatness of the cut faces is achieved in the overmilled wires 24 of FIG. 6, sharp edges are still maintained which are unsuitable for producing good resistance welds.

Figure 7:
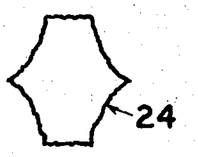

Following overmilling, the resist 18 is removed to produce the wire as shown in FIG. 7. The wire is then electro-chemically polished to produce the finished wire 26 of FIG. 8. The electro-chemical polishing or ECP consists of activating the wire surfaces by placing the wire in a dilute acid bath, such as 10–20 percent $HNO_3$ from 10–60 seconds. While activation is not absolutely essential, it will result in a more consistent and smoother wire surface.

The activated wire is then placed into an ECP solution such as 50 percent $H_2SO_4$ – 30 percent $H_3PO_4$ – 20 percent $H_2O$ and with the wire being made the positive terminal of a DC electrical circuit. The negative terminal may be any electrically conductive material which is non-reactive with the ECP solution under the conditions of use. The ECP solution, while it will cause general reduction of all surface dimensions, will act principally on the sharp edges of the wire by electrochemically removing metal from the extreme ends of the edges.

The polishing action is continued until the sharp edges of the wire have become rounded. Normally about 5–10 minutes at current densities of approximately 100–2,500 amperes/sq.ft. of exposed surface will be satisfactory. Higher current densities can be used if desired.

With the particular ECP solution indicated, it is important that the temperature of the solution be maintained within the proper temperature range (32° and 65° C) to produce surfaces suitable for welding. Below 25° C very rough surfaces are produced, below 45° C shiny but pitted surfaces are formed, between 50° and 60° C, smooth and shiny surfaces result, between 62° and 68° C smooth but dull surfaces are made while above 70° C very rough surfaces are again produced.

If a deposit of primarily nickel sulfate is formed on the wire surfaces during ECP, it can easily be removed by normal water rinsing for several minutes. Following drying, the wire, having a height depending upon the initial workpiece height, is ready for welding, packaging or other mechanical handling. For example, the wire height may range from 0.015 inches and 0.030 inches corresponding to initial sheet thicknesses of 0.020 inches and 0.040 inches, respectively.

FIG. 9 represents a composite of the manufacturing steps. Metal A is removed from the original workpiece 10 before the pattern resist 18 is applied. Metal B is removed to form the cut-through shape 22 while the overmilled shape 24 is produced by the removal of metal C. The final wire 26 is formed by the ECP removal of metal D.

Figure 10:
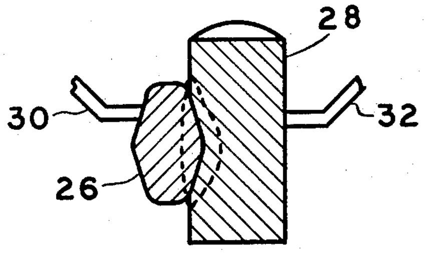
FIG. 10 illustrates the welding of the chemically formed wire formed by the inventive method of FIGS. 1–8.

The advantages of wires produced by this process can best be illustrated in FIG. 10 which shows a wire 26 resistance welded to an electronic component (resistor, capacitor, transistor, etc.) lead 28 between welding electrodes 30 and 32. The weld nugget is generally defined with dotted lines.

Although particular procedures for carrying out the inventive process have been illustrated and described, it is intended that these are provided by way of example only, the spirit and scope of this invention being limited only by the proper scope of the appended claims.

What I claim is:

1. A method of chemically forming a plurality of elongated free form wires from a sheet of electrically conductive material susceptible to chemical etching comprising the steps of:

masking aligned chemically resistant patterns on opposite sides of the sheet of material;

chemically milling the unmasked portions of the sheet of material to cut-through between the wires formed between the aligned masked patterns; and electro-chemically polishing the wires to round the sharp edges of the wires.

2. The method of claim 1 wherein the electrically conductive material susceptible to chemical etching is nickel or a nickel alloy.

3. The method of claim 1 wherein the electrically conductive material susceptible to chemical etching is selected from the group consisting of iron, iron alloy, magnesium, magnesium alloy, zinc, zinc alloy, titanium, titanium alloy, aluminum and aluminum alloy.

4. A method of chemically forming a plurality of elongated nickel or nickel alloy wires from sheet material comprising the steps of:

chemically etching opposite sides of the sheet material to remove any work-hardened surface layers therefrom;

masking aligned chemically resistant patterns on the chemically etched opposite sides of the sheet material;

chemically milling the unmasked portions of the sheet material to cut-through between the wires formed between the aligned masked patterns;

overmilling the wires to reduce the cut-through ridges on the wires;

removing the masking patterns from the wires; and electro-chemically polishing the wires to round the sharp edges thereof.

5. The method of claim 4 wherein the masking of aligned chemically resistant patterns is produced by photo exposure and development of a photoresist applied to the opposite sides of the sheet material.

6. The method of claim 4 wherein the sheet material is from 0.010 inches and 0.10 inches in thickness.

7. The method of claim 6 wherein from between 0.0005 inches and 0.0015 inches are chemically removed during the initial chemically etching step.

8. The method of claim 4 wherein the chemical etchant is 40° Baume ferric chloride.

9. The method of claim 8 wherein the overmilling step is approximately 20–80 percent of the time of the chemically milling step.

10. The method of claim 4 wherein the electrochemically polishing step includes an initial activation in a dilute acid bath of between 10–20 percent $HNO_3$ for from 10–60 seconds.

11. The method of claim 4 wherein the electrochemical polishing is performed in a solution of 50 percent $H_2SO_4$, 30 percent $H_3PO_4$, and 20 percent $H_2O$ with the wires as the positive terminal of a DC electrical current.

12. The method of claim 11 wherein the electrochemical polishing is performed for between 5–10 minutes at current densities of approximately 100–2,500 amperes per square foot of exposed wire surface.

13. The method of claim 11 wherein the electrochemical polishing solution is maintained at a temperature approximately between 32° and 65° C.

14. The method of claim 13 wherein the electrochemical polishing solution is maintained at a temperature approximately between 50° and 60° C.

15. The method of claim 11 wherein the electrochemically polishing step includes a final rinse in water to remove any nickel sulfate deposits from the wires.

16. A method of chemically forming a plurality of elongated wires from a self-supporting sheet of electrically conductive material susceptible to chemical etching comprising the steps of:

chemically etching opposite sides of the sheet material to remove any hardened surface layers therefrom;

masking aligned chemically resistant patterns on the chemically etched opposite sides of the sheet of material;

chemically milling the unmasked portions of the sheet of material to cut-through between the wires formed between the aligned masked patterns; and electro-chemically polishing the wires to round the sharp edges of the wires.

17. A method of chemically forming a plurality of elongated free form wires comprising the steps of:

providing a substantially rigid, unbacked, flat sheet of an electrically conductive material susceptible to chemical etching;

chemically etching the opposed flat sides of the sheet to remove any hardened surface layers therefrom;

masking aligned chemically resistant patterns on the chemically etched opposed flat sides of the sheet;

chemically milling the unmasked portions of the sheet to cut-through between the wires formed between the aligned chemically resistant masked patterns;

overmilling the formed wires to reduce the cut-through ridges remaining on the wires;

removing the masking patterns from the formed wires; and electro-chemically polishing the formed wires to round the sharp edges thereof.

18. A method of chemically forming a plurality of elongated nickel or nickel alloy free form wires comprising the steps of:

providing a flat sheet of nickel or nickel alloy material having a thickness between 0.010 and 0.10 inches;

chemically etching from between 0.0005 to 0.0015 inches from each of the two opposed flat surfaces of said sheet to remove any hardened surface layers therefrom;

masking aligned chemcially resistant patterns on the chemically etched opposed flat surfaces by a photo resist process:

chemically milling the unmasked portions of the sheet to cut-through between the wires formed between the aligned chemically resistant masked patterns:

overmilling the formed wires an additional 20 to 80 percent of the chemical milling time to reduce the cut-through ridges remaining on the wires;

removing the masking patterns from the overmilled wires; and electro-chemically polishing the formed wires to round the sharp edges thereof.

* * * * *